April 22, 1952 R. DESKIN ET AL 2,593,995
SEMIAUTOMATIC FISHING DEVICE
Filed May 4, 1951 3 Sheets-Sheet 2

INVENTORS.
ROY DESKIN
CHRISTIAN W. SAVITZ
BY
Hyde, Meyer, Baldwin & Doran
ATTORNEYS April 22, 1952  R. DESKIN ET AL  2,593,995
SEMIAUTOMATIC FISHING DEVICE
Filed May 4, 1951  3 Sheets-Sheet 3
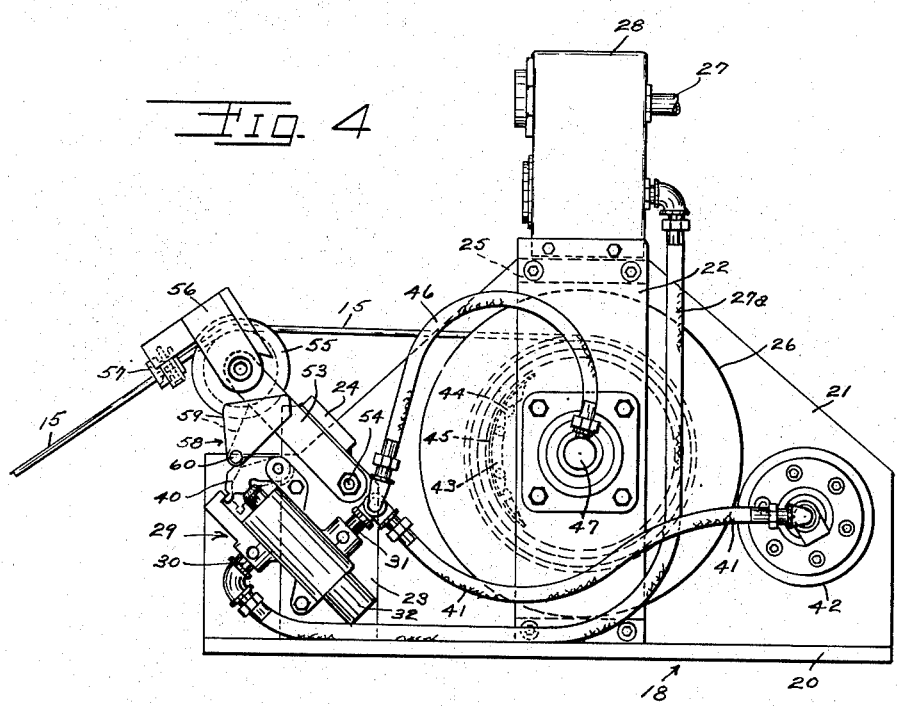
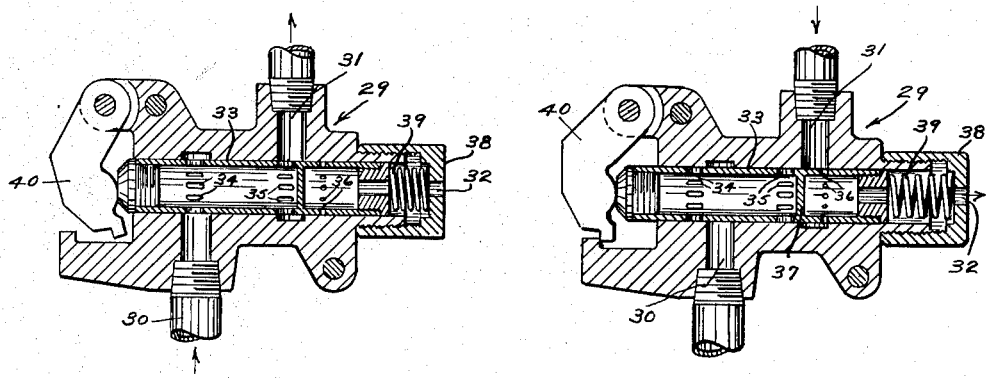
INVENTORS.
ROY DESKIN
CHRISTIAN W. SAVITZ
BY
Hyde, Meyer, Baldwin & Doran
ATTORNEYS Patented Apr. 22, 1952

2,593,995

UNITED STATES PATENT OFFICE 2,593,995

SEMIAUTOMATIC FISHING DEVICE

Roy Deskin, Costa Mesa, Calif., and Christian W. Savitz, South Euclid, Ohio, assignors to Iron John, Inc., a corporation of California Application May 4, 1951, Serial No. 224,627

10 Claims. (Cl. 43—4)

This invention relates to improvements in fishing devices and more particularly to semi-automatic fishing devices.

One of the objects of the present invention is to provide a means for reeling in fishing line responsive to a pull by the fish.

Another object of the present invention is to provide a means to deenergize a reel drive after after a predetermined extent of line reel-in.

Another object of the present invention is to provide in a machine of the type described means for reeling in the fishing line responsive to a pull by a fish until a predetermined extent of line has been reeled in.

Another object of the present invention is to provide in a machine of the type described means for reeling in the fishing line responsive to a pull by a fish until a predetermined extent of line has been reeled in, at which time the line freely unreels to drop the fish to the boat deck.

Another object of the present invention is to provide a single sensitive means controlling the reel-in of the fish line responsive to a pull by the fish, the stopping of the reel-in responsive to a predetermined extent of line reel-in, and the free unreeling of the line to drop the fish to the deck.

Another object of the present invention is to provide a means on said line to contact a single sensitive means to control the extent of line reel-in.

Another object of the present invention is to provide a clutch and motor, or a motor only, to drive the fishing line reel in any of the above means.

Another object of this invention is to provide in any of the above means for reeling in the line a means requiring an off-center pull by the fish to cause reel-in.

Another object of the present invention is to provide in any of the above combinations a means attached to the line to return it to the water.

Other features of my invention reside in the arrangement and design of the parts for carrying out their appropriate functions.

Other objects and advantages of my invention will be apparent from the accompanying drawings and description and the essential features thereof will be set forth in the appended claims.

In the drawings,

Fig. 4 is an elevational view taken from the opposite side of Fig. 2;

Fig. 5 is a longitudinal sectional view of an air valve shown in its closed or exhaust position; while Fig. 6 is a longitudinal sectional view of the same valve, similar to Fig. 5, but with the valve shown in its open position.

Figure 1:
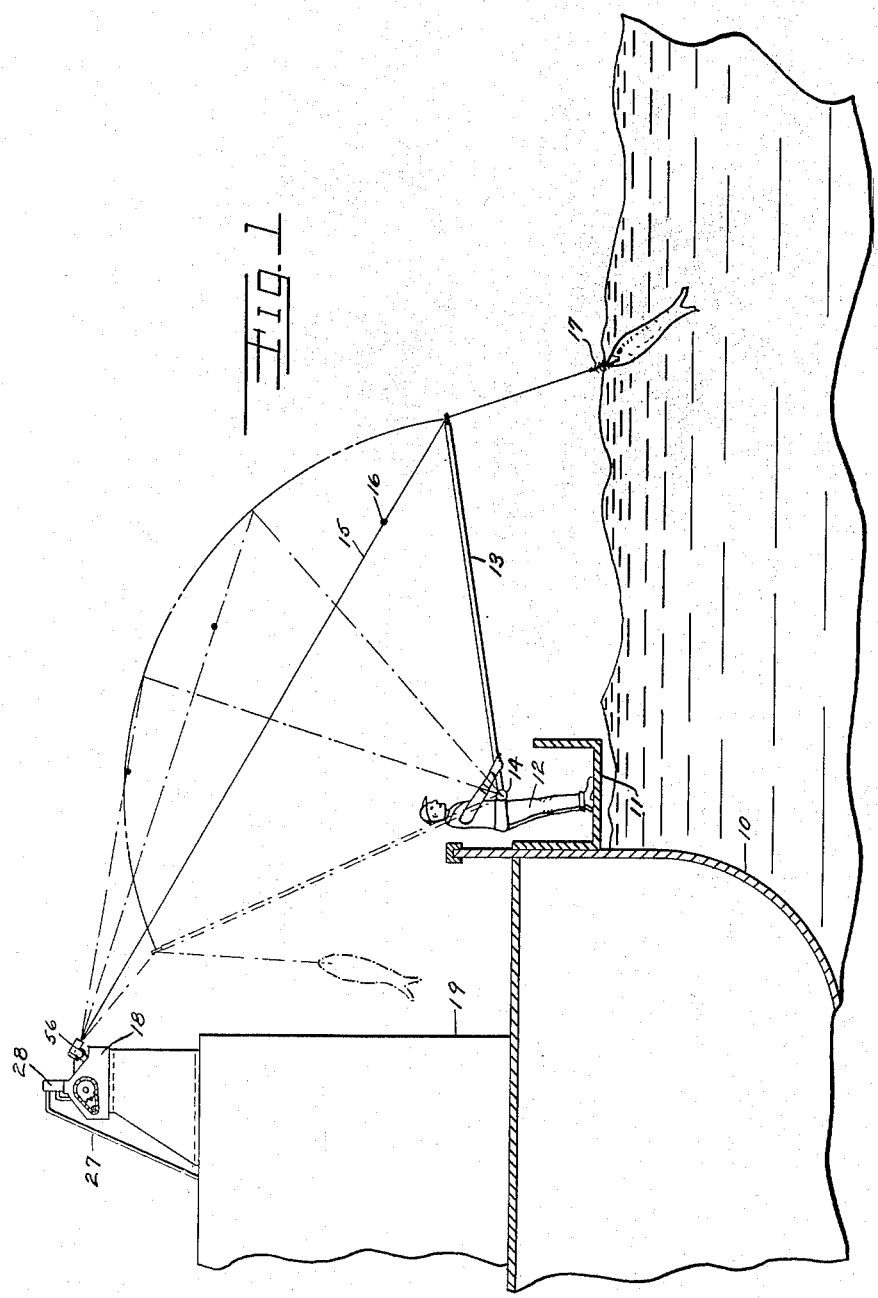
Fig. 1 is an elevational view of the novel semiautomatic fishing device of this invention.

The semi-automatic fishing device of this invention is adapted to be mounted on any boat 10, as shown in Fig. 1. It is especially designed for catching large fish with less fatigue to the fisherman. The fisherman 12 generally stands on a platform 11 attached to the boat and has a leather belt around his waist to which is pivotally supported a fishing pole 13 by means of a socket 14. The pole is attached to the line 15 to serve as a means to return the line to the water to catch the next fish with lure 17, sometimes consisting of a bunch of feathers and a hook. Stop member 16 it attached to the line and serves as a means to limit the movement of the line on to the reel. This operation will be described more in detail later in the specification.

The control and drive mechanism of the semiautomatic fishing device is mounted on top of the deck house 19 or on a tower on top of the deck house, as seen in Fig. 1. The deck house often contains a live bait tank. The frame of the device, shown generally at 18, consists of a bottom wall 20, a vertical side wall 21, vertical plates 22 and 23, an overhanging stop plate 24 attached to plate 23, and a horizontal plate 25. The frame 18 can be made of either a welded or bolted construction, whichever is desired.

A reel 26 holds the fishing line 15. The reel is rotatably mounted between side wall 21 and vertical plate 22 of the frame.

The power to drive the reel may, of course, be electrical, mechanical, or fluid power, the latter including air, hydraulic fluids or steam. For purposes of illustration, but not limitation, the semi-automatic fishing device will now be described with air being used as the fluid power. A source of air under pressure within the deck house supplies air to the box 28 through the air inlet line 27. The box 28 contains the usual elements found in an air system, namely, an air filter, pressure regulator, gauge, water separator and lubricator unit. These form no part of this invention and so are not illustrated in detail.

An air valve to control the supply of the air to the driving machinery is shown generally at 29 and is connected with box 28 by air line 27a. The valve has an inlet 30, connected to the air line 27a, and an outlet 31, connected to the air motor and clutch, to be described hereinafter. An exhaust port 32 permits exhaust of the air from the air motor and clutch, when desired. Tubular plunger 33 is axially movable within the casing of valve 29 to align the inlet openings 34, the outlet openings 35 or the exhaust openings 36 with the desired port or pressure line. Partition 37 prevents the incoming air, under pressure, from rushing out the exhaust port 32. The screwed on cap 38 supports a spring 39 to return the plunger to its normal and exhausting position whenever the pivoted valve actuator 40 does not depress it. The valve is shown in its normal, exhausting or closed position in Fig. 5, and in its open position in Fig. 6. When actuator 40 is depressed, it opens the valve and permits the air to pass from the inlet 30 to the outlet 31 and then on to the air motor and clutch. Of course, if the clutch and motor were electrically actuated, the pivoted actuator 40 could control a spring loaded electrical switch.

Means to rotate reel 26 are provided. This means for causing the reeling in of the fishing line 15 is a drive consisting of a motor, or a clutch and a motor. Air line 41, from outlet 31 of the valve, supplies air under pressure to the air-operated motor 42. The patent to Shaaf, No. 1,781,133, issued November 11, 1930, illustrates one type of air motor which could be used. The specific type of motor used forms no part of this invention.

A quick release clutch 43 is mounted inside the bore of reel 26 and driven by the motor 42. The drawings illustrate an air clutch similar to the air clutch disclosed in the Fawick patent, No. 2,251,445, granted August 5, 1941, but other types may be used. The driven member of the clutch is the bore of reel 26 while the driving member consists of an inflatable, flexible tube 44 having wear shoes 45 atached to its periphery and engaging the bore or hollow shaft of reel 26. Air line 46 leads from the valve outlet 31 through the coupling 47 to the tube 44 in the clutch. The air clutch is normally in an unclutching position since that is the normal position of the clutch when valve 29 supplies no pressure. When air pressure is supplied by the valve, the tube 44 expands so that the wear shoes 45 clutchingly engage the bore of the reel and drive the reel.

This invention contemplates, in addition to the specific construction disclosed in the drawings, the construction wherein a single motor drives a plurality of reels, each controlled by an independent clutch. Then, a plurality of semi-automatic fishing devices, as disclosed herein, may be used simultaneously. Of course, the air motor 42 may be replaced by any motor of well known construction, not actuated by the clutch actuating valve 29, if it is desired to have the motor rotating continuously and the reel entirely controlled by the clutch. This latter construction may be used where the motor drives either a single reel, as disclosed in the drawings, or a plurality of reels, as mentioned above.

Of course, if the clutch were an electrical clutch actuated by either a solenoid or other means, it could be controlled by either an electrical switch substituted for the valve 29 or a switch responsive to the pressure fluid emerging from valve 29.

The invention also contemplates the use of a free wheeling motor driving the reel without a clutch. By free wheeling, it is meant that when the air pressure is reduced or the motor is deenergized, the motor and the driven reel will rotate freely. In the air type motor, this result would be attained by the common jet and rotating blade or vane type air motor.

The drive means between the motor and clutch can be of any conventional type, but merely for illustration, the drawings disclose a motor driven sprocket 48 and a clutch driving sprocket 49, attached to the driving member of the clutch, and a chain 50, drivingly connecting the sprockets 48 and 49. The chain tightening means, to eliminate slack in the chain, consists of an adjustable motor mount. The motor is mounted by bolts 51 in slots 52 in the side wall 21. The bolts may be tightened in any desired position to eliminate slack from the chain.

The next means to be described performs a dual function. First, when the fish jerks the line 16, it energizes or causes operation of the clutch 42 and motor 41. The motor driven reel then reels in the fishing line. Second, responsive to a predetermined extent of line reel-in, the means then stops the driving of the reel 26 by disengaging the clutch 42 and deenergizing the motor 41. This permits free wheeling of the reel backwards and the unreeling of the line 16 under the weight of the fish so as to drop the fish toward the deck, as shown in broken lines in Fig. 1. This means includes the air valve 29 and also the mechanism now to be described.

Link 53 is pivoted to the vertical plate 23 about a pivot point 54.

Figure 2:
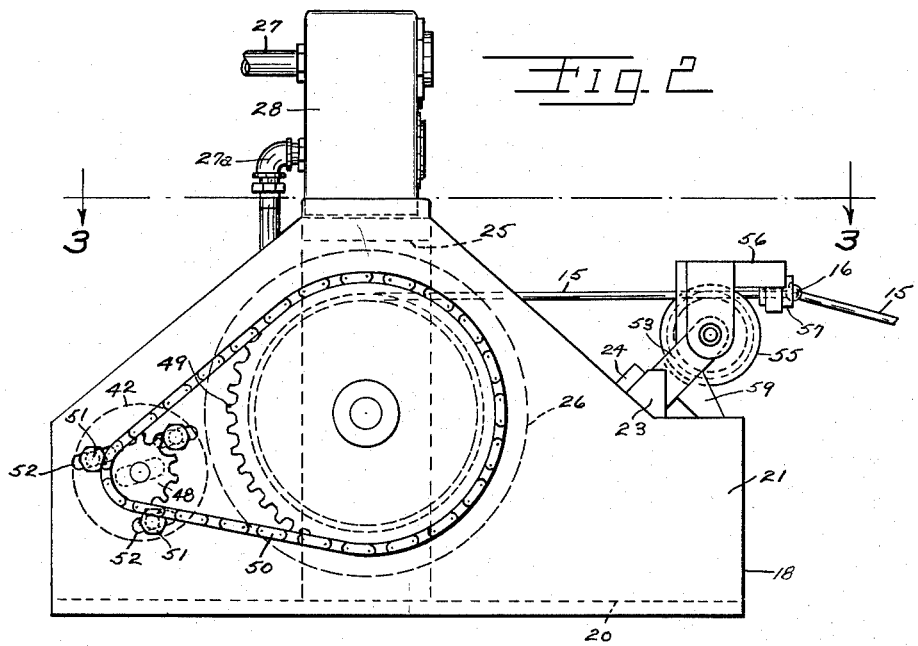
Fig. 2 is an enlarged elevational view of the control and drive mechanism mounted on top of the boat deck house.
Figure 3:
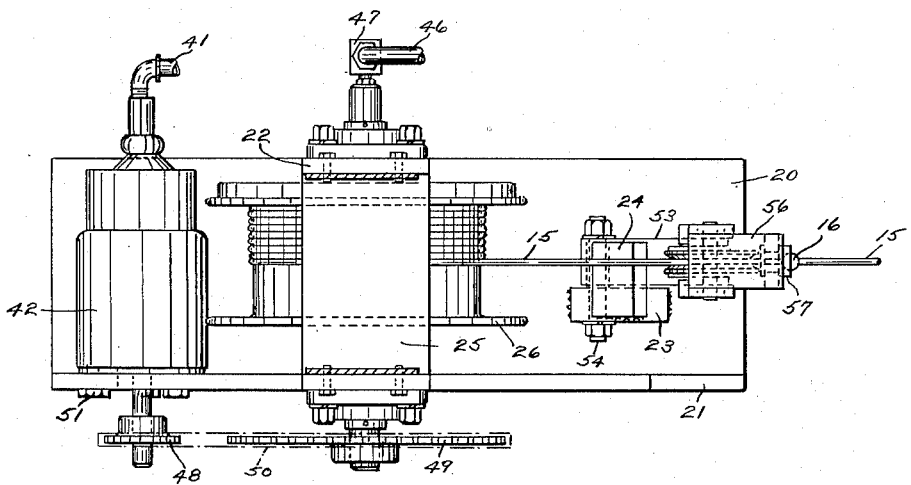
Fig. 3 is a top view of Fig. 2, with some parts omitted, and taken along line 3—3 of Fig. 2.

The upper limit of its motion is controlled by the overhanging stop plate 24 attached to plate 23. The link has a pulley 55 and a fishing line guide 56, both pivoted about the same point. A forwardly extending bracket 58, attached to the link, has parallel side arms 59 connected by a cross bar 60 adapted to bear against the pivoted valve actuator 40. The guide 56 has a bumper 57 adapted to be engaged by the stop 16, as seen in Fig. 2. In the first function set forth above, when the fish jerks the line, link 53 pivots counter-clockwise in Fig. 4 and crossbar 60 moves valve actuator 40 to open the valve 29 and energize the clutch and motor so as to reel in the fishing line. In the second function, stop 16 engages bumper 57, after the line has been reeled in the desired amount. This movement pivots link 53 clockwise (Fig. 4) to shift the valve 29 to its exhaust position to deenergize the clutch and motor. Of course, this cross bar 60 and pivoted actuator could also operate a spring loaded electric switch to control an electric motor and clutch, if electric power were used.

The operation of the semi-automatic fishing device will now be described. The fisherman 12 lowers the pole 13 until the lure and hook 17 is in or near the water. Most of the line 15, if not all of it, is now off of the reel 26. A fish strikes the hook and is caught thereon. In his struggle to escape, he pulls downwardly on the line 15. Since the line 15 to the left of guide 56 in Fig. 4 forms an obtuse angle with respect to the line from the guide 56 to the reel and since the end of the line 15 is firmly anchored to the reel 26, the pull of the fish creates an off-center pull upon guide 56 and pulls it downwardly about its pivot point 54. This movement pivots actuator 40 from the full line to broken line position in Fig. 2. The actuator 40 opens the valve 29 so as to allow air under pressure to flow to the clutch 43 and motor 42. The clutch is engaged and the motor drives the reel 26 so as to wind in the line 15. When the fish is over the deck of the boat, the stop member 16 hits the bumper 57 on the guide 56 whereupon the pull of the driven reel on the line moves the guide 56 to the position shown in Fig. 2, which stops the supply of air to motor 42 and clutch 43 and at the same time connects the air line 31, 41, 46 to the motor and clutch with the exhaust port 32, since valve 29 is normally in its exhausting position, as seen in Fig. 5. This stops the pull on the line, and since deflation of tube 44 releases clutch 43 from reel 26, the fish drops to the deck of its own weight. The reel may free wheel because of either the disengaged clutch here disclosed or a free wheeling motor drive, previously mentioned as a possible modification. This free wheeling feature also prevents line breakage caused by an attempt to suddenly stop a reel driving means of high inertia. Nine times out of ten the flopping of the fish will release it from the hook or lure 17, whereupon the fisherman again returns the pole to the full line position of Fig. 1. If not, the hook must be disengaged by hand.

Even if an independent drive motor, not controlled by valve 29, is used to drive a single reel or a plurality of reels, each controlled by a clutch and a valve 29, the operation is substantially identical. The operation is also substantially identical whether pressure fluid or electric power is used as the power medium.

While using this semi-automatic fishing device, the fisherman may increase his catch per hour and reduce the time required to catch each fish. The semi-automatic feature makes it less fatiguing on the fisherman and requires fewer men to land large fish but still permits the fisherman to have complete control at all times. It is especially adapted for catching, reeling in and hauling aboard the fishing boat large sized fish running in schools in the ocean.

Means may also be utilized to prevent breaking the line either when hooking the fish or when the stop member 16 strikes the bumper 57. In the form shown, this is accomplished by utilizing a nylon line which stretches quickly and contracts slowly to its original length. It could also be accomplished by utilizing a snubber device with a dashpot or spring return between the stop plate 24 and pivot link 53. The stretch of the nylon line also prevents the reel from pulling the hook out of the fish's mouth.

What we claim is:

1. A fishing device comprising a reel having a fishing line leading therefrom, means for causing reeling in of said line, means responsive to a pull on said line for causing operation of said first means, and means for causing free unreeling of said line from said reel responsive to a predetermined extent of line reel-in.

2. A fishing device comprising a reel having a fishing line leading therefrom, a first means to rotate the reel, a second means on the fishing line to limit its movement on to the reel, and a third means causing the first means to rotate the reel when a fish jerks the line and stopping the driving of the reel by the first means when the second means engages said third means.

3. A fishing device comprising a reel having a fish line leading therefrom, a first means to rotate the reel, a second means on the fishing line to limit its movement on to the reel, a third means causing the first means to rotate the reel when a fish jerks the line and stopping the driving of the reel by the first means when the second means engages said third means, and a means attached to the line to return it to the water.

4. A fishing device comprising a reel having a fishing line leading therefrom, a stop on said fishing line, a quick release clutch, a means to drive the reel through the clutch, and a means engaged by the fishing line and operatively connected with said clutch to cause the clutch to be engaged by a jerk on the line by a fish, said latter means disengaging the clutch when said latter means is engaged by said stop as the line is being reeled in.

5. A fishing device comprising a reel having a fishing line leading therefrom, a stop on said fishing line, a quick release clutch, a means to drive the reel through the clutch, and a pivoted means engaged by the fishing line and operatively connected with said clutch to cause the clutch to be engaged by a jerk on the line by a fish, said latter means disengaging the clutch when said latter means is engaged by said stop as the line is being reeled in.

6. A fishing device comprising a reel having a fishing line leading therefrom, a stop on said fishing line, a quick release clutch, a means to drive the reel through the clutch, and a pivoted means engaged by the fishing line and operatively connected with said clutch, the portion of the line from said reel to said pivoted means and the portion of the line from said pivoted means to a fish on the end of the line forming an obtuse angle, said pivoted means causing the clutch to be engaged by an off-center pull on the line by a fish, said pivoted means disengaging the clutch when said latter means is engaged by said stop as the line is being reeled in.

7. A fishing device comprising a reel having a fishing line leading therefrom, a fluid motor to drive the reel, a source of pressure fluid, a valve controlling supply of said fluid to said motor, a fishing line guide in operative connection with said valve, said guide having the operative connection adapted to actuate said valve to energize said motor when the line is pulled by a fish.

8. A fishing device comprising a reel having a fishing line leading therefrom, a fluid motor driving the reel, a stop on the fishing line, a source of pressure fluid, a valve in the fluid line to said motor, a fishing line guide in operative connection with said valve to shut off the fluid supply when said stop engages said guide as said line is being reeled in.

9. A fishing device comprising a reel having a fishing line leading therefrom, a stop on said fishing line, a fluid motor to drive the reel, a source of pressure fluid, a valve controlling supply of said fluid to said motor, a fishing line guide in operative connection with said valve, said guide having the operative connection adapted to actuate said valve to energize said motor when the line is pulled by the fish and adapted to actuate said valve to shut off the fluid supply to the motor to deenergize it when the stop engages the guide as the line is being reeled in.

10. A fishing device comprising a reel, a fishing line wound around the reel, a pole attached to the line and adapted to return the line to the water, a stop attached to the line between the pole and the reel, a fluid motor, a fluid operated clutch driven by said motor and driving said reel, said clutch normally in unclutching position, a pivoted guide for the fishing line, a normally closed valve to supply said clutch and motor with fluid, said guide operatively connected to said valve and adapted to actuate the valve to supply fluid to the motor and clutch to reel in the line when the fishing line is pulled by the fish and adapted to release the valve to its closed position and the clutch to its unclutching position when the stop engages the said guide as the line is being reeled in, whereby the weight of the fish will drop it to the deck by causing the reel to free wheel.

ROY DESKIN.
CHRISTIAN W. SAVITZ.

No references cited.